United States Patent Office 3,817,770
Patented June 18, 1974

3,817,770
CONCRETE COMPOSITION
Bruce E. Dunworth, Baltimore, and Wate T. Bakker, Severna Park, Md., assignors to General Refractories Company, Philadelphia, Pa.
No Drawing. Filed Sept. 15, 1971, Ser. No. 180,922
Int. Cl. C04b *13/22, 31/20, 31/02*
U.S. Cl. 106—315          4 Claims

ABSTRACT OF THE DISCLOSURE

A technique and composition are provided which afford substantial improvement in reducing rebound of gunnable hydraulic concrete compositions. Rebound is reduced for concretes containing calcium aluminate cements from on the order of 25 to 50 weight percent to about 10 to 15 weight percent. Corresponding and similar improvements are attained with other hydraulically settable concretes. The technique and composition comprise adding about 0.05 to 0.3 weight percent of an inorganic salt of an alkali metal ionizable in water and 0 to 2.0 weight percent ball clay to the concrete formulation.

---

In the employment of hydraulic cements, it is often desirable to employ pneumatic techniques for projecting a settable concrete mix onto a surface. Such techniques are often superior to alternative techniques for attaining conformance of the mix to complex shapes and superior penetration of reinforcing. Other advantages include better control of water content and the elimination of amounts of water in excess of that required to hydrate the cement present in the concrete, resulting in higher densities, superior physical properties, and the like. All the many advantages of such techniques are well known to those of ordinary skill in the art.

Such techniques, known generally as "gunning" employ compressed air to mix the components of the formulation and to project it into place. Unlike other techniques, the projection of a stream of solid particulate materials and water obviates the necessity of attaining a plastic mixture of cement, water, and aggregate, and accordingly less water is required. In gunning techniques, the ingredients of the mix are generally projected through one or more nozzles at high velocities and pressures, with mixing occurring either in a mixing chamber preceding the nozzle of the "gun" or by the confluence of diverse streams from a plurality of nozzles. A layer of substantially any desired thickness can be attained by spraying the mix onto a surface. The high velocity impingement of the particles of the mix affords a substantial degree of compaction and sel-supporting, low slump cement bodies result.

Despite the many advantages of gunning techniques, there is a major disadvantage which, in many circumstances, precludes effective utilization. At the point of impingement, the cement particles and aggregate filler particles rebound from the surface; the cement particles are not sufficiently hydrated to deform under impact and to adhere to the surface impinged upon. Such rebound can cause substantial material losses, in some cases as high as fifty percent.

Typical of concretes employed in such gunning techniques, and rather an extreme example of the problem of rebound, is the use of concretes containing calcium aluminate cements. In these concretes the calcium aluminate cement is often combined with refractory aggregates, such as alumina, aluminum silicate, and the like for the production of refractory coatings in furnaces and like high temperatures environments where refractory materials are required. In such contexts, the employment of gunning techniques is often indicated, but rebound losses of twenty-five to fifty weight percent cause substantial penalties.

It has been attempted in the past to reduce rebound loss by a number of techniques. The presently most efficacious has been the inclusion of about 0.5 to 4.0 weight percent ball clay in the formulations. Some improvement has resulted, but even with such manipulations, rebound losses are still considerable, usually in excess of about twenty weight percent. The desirability of still greater reductions in rebound loss is readily apparent.

It is an object of the present invention to provide a method of reducing rebound loss in processes for gunning hydraulic concrete formulations. A further object is the provision of hydraulic cement formulations susceptible to gunning with reduced material rebound. These and still other objects, apparent from the following disclosure are attained by the present invention.

It has been observed that the inclusion of ball clay in hydraulic cement formulations accelerates the increase in viscosity characteristic of mixture of hydraulic cement and water. A slurry of calcium aluminate in water, in a weight ratio of 2.25:1, attains a Brookfield viscosity of 2000 cps. in about twelve minutes and of 5,000 cps. in about fourteen minutes after mixing. With the addition of 10.0 percent by weight, based on the weight of calcium aluminate, of ball clay of a conventional type, the corresponding times were, respectively, about six minutes and about seven and one-half minutes. It has now been found that such viscosities can be attained substantially earlier in the life of such slurries by the inclusion of minor amounts, on the order of about 0.5 to 1.0 weight percent, based on the weight of the hydraulic cement, of an inorganic salt of an alkali metal ionizable in water and 0 to 10.0 weight percent, based on the weight of the hydraulic cement, of a ball clay. In forming a calcium aluminate slurry in water in the weight ratio of 2.25:1, further containing about 1.0 weight percent sodium nitrite, the slurry had an initial viscosity, as soon as the components were sufficiently mixed to measure, of 2000 cps., and attained 5000 cps. in about five and one-half minutes. When 1.0 weight percent sodium carbonate was employed, an initial viscosity of 5000 cps. was obtained.

Present commercial refractory concretes contain 10–30% calcium aluminate cement by weight. Thus additions of inorganic salts of an alkali metal to a refractory concrete will generally range from about 0.05 to 0.3% based on the total weight of the composition as a whole to obtain increases in viscosity similar to those obtained in neat cement water slurries. In the same manner ball clay additions range from 0–3% based on the total weight of the concrete formulations.

It is not entirely clear at present in what fashion viscosity and rebound loss are related, but it has been observed that the higher the viscosity at the time of impingement, the lower is the rebound loss. It could be hypothesized, although there is no intent for the present invention to be limited or restricted thereby, that viscosity is a measure of the capacity of the mix to deform plastically, rather than elastically, so that the energy of impingement is absorbed by compaction of the mix rather than by elastic rebound. Plastic deformation requires that the material be coherent, and increased viscosity is a measure of increased coherence of the mix. Since, by virtue of the present invention, comprising the inclusion in hydraulic concrete formulations of 0.05 to 0.3 weight percent of an inorganic salt of an alkali metal and 0 to 3.0 weight percent ball clay, based on the weight of cement in the mix, the initial and early viscosities are substantially increased, the coherence of the formulation is also increased and rebound loss is dramatically reduced.

The functional operation of the present invention is illustrated in the following Example, which is intended solely to serve to guide those of ordinary skill in the art in the practice of the invention and is in no way intended to be construed as limiting the scope of the invention, which is defined in the claims appended hereto.

EXAMPLE

A plurality of hydraulic concrete formulations, based on a mixture of 17.5 weight percent of high alumina calcium aluminate cement and 82.5 weight percent aluminum silicate aggregate was projected by a dry pneumatic gun and mixed with water in an approximate weight ratio of 2.25:1, based on the weight ratio of cement-to-water, and the rebound loss was measured. The formulations were varied as illustrated in the following table, where the rebound losses are also shown. All percentages in the Table are by weight, with the amounts of additives based on the total weight of the concrete formulation.

| Run | Additive | Amount | Rebound loss |
|---|---|---|---|
| 1 | None | | 25 |
| 2 | Ball clay | 2.0 | 20 |
| 3 | Na$_2$CO$_3$/ball clay | 0.2/2.0 | 10 |
| 4 | do | 0.15/2.0 | 13 |
| 5 | Na$_2$CO$_3$ | 0.175 | 15 |
| 6 | NaNO$_2$ | 0.20 | 11 |
| 7 | NaNO$_2$/ball clay | 0.20/2.0 | 11 |
| 8 | NaNO$_2$ | 0.15 | 14 |
| 9 | NaNO$_2$/ball clay | 0.15/1.0 | 11 |
| 10 | do | 0.15/2.0 | 15 |

The advantages of the instant invention are realized by the addition of from about 0.05 to about 0.30 weight percent of an inorganic salt of an alkali metal ionizable in water and from about 1.0 to about 2.0 weight percent ball clay to the concrete formulation.

It is readily apparent from the Table that substantial improvement is effected by the present invention, where rebound losses are reduced by forty to sixty percent. It is likewise apparent that substantial improvement can be effected by the inclusion of the inorganic alkali metal salts alone, but the inclusion of up to about 2.0 weight percent ball clay can also be of benefit and is accordingly a preferred ingredient.

While the foregoing operations in the Example are confined to calcium aluminate, the invention is equally applicable to other hydraulic cements as well. Similarly, still other alkali metal inorganic salts could be employed, such as, for example, sodium nitrate, sodium phosphate, sodium silicate, sodium chloride, and the corresponding salts of other alkali metals, notably potassium. Sodium and potassium salts are preferred, principally for economic reasons.

What is claimed is:

1. A settable concrete composition suitable for gunning consisting essentially of a mix containing about 17.5% of a high alumina calcium aluminate cement, about 82.5% of an aluminum silicate aggregate and water in an amount sufficient to provide a cement-to-water ratio of about 2.25:1.0; said mix having added thereto about 1% to 2% by weight of concrete mix of a ball clay and from about 0.15 to about 0.20% by weight of concrete mix of an inorganic alkali metal salt selected from the group consisting of sodium nitrite and sodium carbonate.

2. The composition of claim 1 wherein the alkali metal salt is sodium nitrite.

3. The composition of claim 1 wherein the alkali metal salt is sodium carbonate.

4. The composition of claim 1 wherein the alkali metal salt is present in an amount of about 0.20 percent.

References Cited
UNITED STATES PATENTS

| | | | |
|---|---|---|---|
| 3,180,748 | 4/1965 | Holmgren et al. | 106—104 |
| 2,695,850 | 11/1954 | Lorenz | 106—315 |
| 2,460,347 | 2/1949 | Heller | 106—104 |
| 2,099,176 | 11/1937 | Scripture | 106—104 |

ALLEN B. CURTIS, Primary Examiner

M. L. BELL, Assistant Examiner

U.S. Cl. X.R.

106—104